US008797109B2

(12) United States Patent
Hielscher et al.

(10) Patent No.: US 8,797,109 B2
(45) Date of Patent: Aug. 5, 2014

(54) ULTRASOUND SYSTEM WITH ULTRASOUND GENERATOR, RESONATOR AND LIGHT SOURCE

(71) Applicant: Dr. Hielscher GmbH, Teltow (DE)

(72) Inventors: Harld Hielscher, Stahnsdorf (DE); Thomas Hielscher, Stahnsdorf (DE); Holger Hielscher, Teltow (DE)

(73) Assignee: Dr. Hielscher GmbH, Teltow (DE)

( * ) Notice: Subject to any disclaimer, the term of this patent is extended or adjusted under 35 U.S.C. 154(b) by 118 days.

(21) Appl. No.: 13/644,329

(22) Filed: Oct. 4, 2012

(65) Prior Publication Data

US 2013/0094183 A1 Apr. 18, 2013

Related U.S. Application Data

(60) Provisional application No. 61/543,429, filed on Oct. 5, 2011.

(51) Int. Cl.
*G01F 23/296* (2006.01)

(52) U.S. Cl.
USPC .......................................... 331/155; 73/290 V

(58) Field of Classification Search
USPC .......................................... 331/155; 73/290 V
See application file for complete search history.

(56) References Cited

U.S. PATENT DOCUMENTS 2,584,128 A * 2/1952 Hildyard .......................... 331/65
2004/0173021 A1* 9/2004 Lizon et al. ................ 73/290 V
2004/0182149 A1* 9/2004 Balin et al. ................. 73/290 V

* cited by examiner

*Primary Examiner* — Joseph Chang

(57) ABSTRACT

An ultrasound system for the generation of low-frequency high-power ultrasound includes a resonator for transmitting the ultrasound to a medium. To safely handle the ultrasound system, the ultrasound system has a light source illuminating a workspace of the ultrasound system.

10 Claims, 1 Drawing Sheet

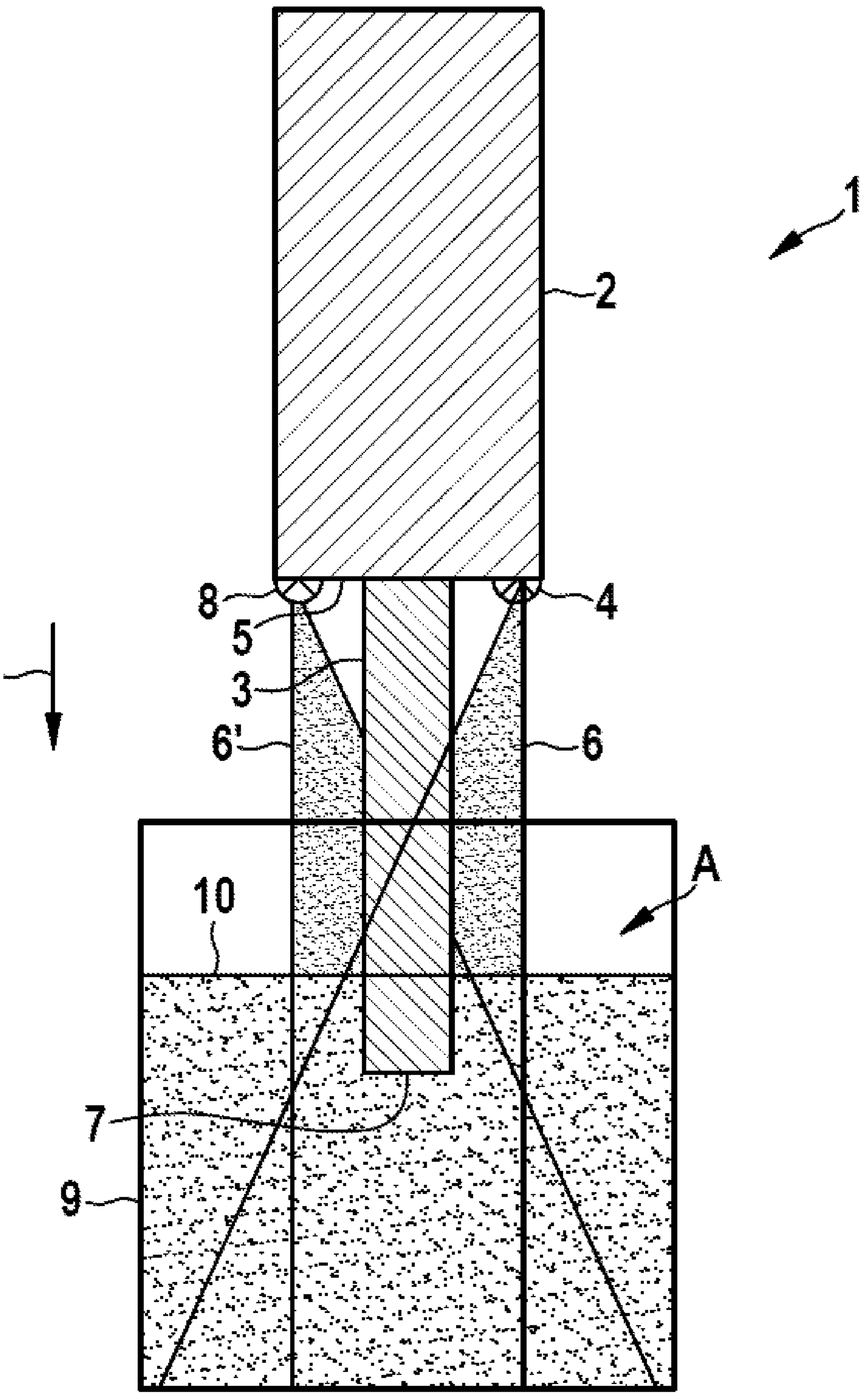
1
2
8
4
5
3
6'
6
A
10
7
9

ULTRASOUND SYSTEM WITH ULTRASOUND GENERATOR, RESONATOR AND LIGHT SOURCE

RELATED APPLICATION

This application claims the benefit of priority under 35 USC §119(e) of U.S. Provisional Patent Application No. 61/543,429 filed on Oct. 5, 2011, the contents of which are incorporated herein by reference in their entirety.

BACKGROUND OF THE INVENTION

The present invention relates to an ultrasound system with an ultrasound generator and a resonator connected to the ultrasound generator for conducting ultrasound and supplying the ultrasound to a fluid medium.

Ultrasound systems are widely used for the generation of low-frequency high-power ultrasound, for example, to atomize flowable media such as dispersions, solvents, water, oils, emulsions, melts, acids, bases and other liquids. For this purpose, low-frequency high-power ultrasound with amplitudes of 1 to 350 μm, preferably 10 to 80 μm and for example 35 μm is generated by the aforementioned ultrasound systems and transmitted from the resonator to the flowable medium. Low frequency high-power ultrasound refers to ultrasound with an operating frequency of 15 to 2000 kHz, preferably 15 to 800 kHz and for example 25 kHz, and an acoustic power above 5 W, preferably 10 W to 20,000 W, and for example 200 W. For example, piezoelectric or magnetostrictive ultrasound generators are used to generate the ultrasound. The resonator is, for example, an acoustic transducer and a two-dimensional or curved plate oscillator or a tubular resonator.

When flowable media are exposed to ultrasound in open containers or vessels, the ultrasound resonator typically extends from above into the liquid to be treated. With this structure, the ultrasound generator is located in this case above the sample to be exposed to ultrasound. Under normal laboratory conditions with for example ceiling-mounted lamps installed above the workspace, the ultrasound system casts a shadow on the sample to be treated. This complicates working and reduces the possibilities for a visual assessment of the result attained with the exposure to ultrasound.

The term ultrasound usually refers to oscillations which are barely or not at all perceptible to the human ear. In addition, the acoustic perception can be additionally impeded by the recommended use of ear protection or sound absorbing enclosures, such as acrylic glass enclosures. It is therefore sometimes difficult to acoustically perceive the operating state of the ultrasound system. However, low-frequency high-power ultrasound produces hazardous conditions during operation, for example, through manual contact, or through formation of splashes or aerosols when immersing an already vibrating resonator in a liquid. Poor illumination of the resonator may make it difficult for the operator to recognize whether the resonator is already immersed in the medium. However, when an already vibrating resonator is immersed in the medium, the medium may shoot from its container due to the ultrasound vibration and endanger or even injure the operator.

It would therefore be desirable and advantageous to obviate prior art shortcomings and to provide an improved ultrasound system, which is safer to operate than conventional ultrasound systems.

SUMMARY OF THE INVENTION

According to one aspect of the present invention, an ultrasound system includes an ultrasound generator, a resonator connected to the ultrasound generator for conducting ultrasound and supplying the ultrasound to a flowable medium, and a light source configured to illuminate at least sections of the resonator.

Because the light source now at least partially illuminates the resonator, the workspace of an operator handling the ultrasound system is well illuminated, even when the ultrasound system is a handheld ultrasound system. The operator can easily detect whether the resonator is already immersed in the medium.

Furthermore, the light source can generate optical feedback for the operator about the operating state of the ultrasound system during operation and handling of the ultrasound system, especially of a handheld ultrasound system. During use, the operator typically looks at the sample to be treated and at a section of the resonator immersed in the sample. Visual displays outside the active viewing field obstruct the work flow and may represent a hazard, since the view must be directed away from the active resonator and thus from the active workspace.

During operation the light source illuminates the field of view of the operator, where it can either provide visual feedback about the operating state of the ultrasound system and/or effectively illuminate the field of view. If the operator looks in the direction of the field of view, then he can clearly see the resonator during the operation of the light source, because the resonator is at least partially illuminated by the light source.

The inventive solution can be improved by various embodiments which are advantageous either separately or in combination. These embodiments and the advantages associated with these embodiments will be discussed below.

Accordingly, at least the part of the resonator, which during operation of the ultrasound system is in direct contact with the flowable medium and which supplies the ultrasound, for example, to the flowable medium, may be illuminated by the light source. During operation of the ultrasound system, in particular the section of the resonator that emits the ultrasound and that is potentially immersed in the flowable medium is located in the field of view of the operator, wherein the operator can always clearly recognize this particular portion of the resonator due to the illumination. The part of the resonator that can be illuminated with the light source is preferably a free end of the resonator facing away from the ultrasound generator.

To be able to adequately illuminate or light the field of view, the light source may have a brightness of at least 0.5 cd, preferably of more than 10 cd, and for example 30 cd. The light source may produce light having selected and in particular arbitrary wavelengths, preferably in the visible range, in particular between 450 nm-550 nm.

In particular, the light source may be oriented to illuminate the surroundings of the resonator, so that at least the medium to be treated with the ultrasound can at least be partially illuminated at least in the field of view of the operator. The visual indications generated by the light source can then also be clearly perceived by the operator.

In order to illuminate the workspace located in field of view of the operator well, the light source may be mounted on the ultrasound generator and be oriented so as to radiate, illuminate or light away from the ultrasound generator during operation. A light source mounted on the ultrasound generator illuminates the workspace of the ultrasound system independent from the orientation of the ultrasound generator, which is particularly advantageous with ultrasound systems that are oriented manually.

When the resonator protrudes from the ultrasound generator, the light source can be oriented so as radiate along the resonator during operation, so that sections of the resonator having a maximum distance from the ultrasound generator as well as workspaces arranged around these sections can also be illuminated.

The resonator may be shaped as a rod, in order to easily reach the media to be treated with ultrasound. With a rod-shaped resonator, the light source is preferably oriented so as to radiate parallel to the resonator during the operation of the light source.

For example, the light source may be an LED, a laser or a lamp, which is preferably positioned so that its light falls largely along the resonator on or into the medium to be treated. A light signal generated by the light source is therefore visible within the field of view of the operator while working with the ultrasound system.

In one embodiment, a light source may be positioned so that the light falls at least partially on the resonator, such that the illuminated resonator can be identified as an optical signal.

It is difficult to estimate an immersion depth of the resonator in the flowable medium in particular with uniformly constructed resonators, which lack any significant variations in diameter or markings, for example, along their longitudinal axis. To produce a marking on the resonator, the light source may be configured to illuminate the resonator partially shaded or significantly brighter in comparison to other illuminated areas of the resonator, wherein the shaded or brighter areas may have a fixed spatial relationship with respect to the resonator. Markings composed of shadows or e.g. light spots or stripes can be used to enable the user to estimate the distance to the sample material or the immersion depth.

The ultrasound system may be configured to operate the light source differently, depending on operating states of the ultrasound system. In this way, the operating state of the ultrasound system is optically displayed to the operator, while the operator looks at the workspace. The operator then does not have to look away from work or operating area to determine the operating state of the ultrasound system, for example look at a control unit of the ultrasound system.

For indicating whether the ultrasound system is in operation, the ultrasound system may be configured to supply operating power to the light source, for example as soon as the ultrasound system generates ultrasound. In a simple embodiment, a continuous light signal may be, for example, started and stopped simultaneous with the ultrasound.

In order to be able to identify different operating states, the ultrasound system may be configured to operate the light source differently, depending on the operating states. For example, operation modes of the light source may comprise one of periodically supplying operation power to the light source, varying the operation power of the light source, changing orientation of the light source and changing color of light emitted by the light source, when a selected operating state exists. Therefore, for example three-color LEDs may be used as light sources. When using several light sources, the light emitted by each of the light sources may have a different wavelength than light emitted by any other of the light sources. More signal information (for example, "In Use", "Malfunction" or "Warning") can then be transmitted to the user. Several possibilities for operating the light sources (also in combination) are available to inform or to warn the operator with optical signals, including:

Continuous operation;
Pulse mode or pulse train;
Variation in luminosity;
Variation of the light color;
Variation of light orientation; or
Varying shapes and projected images.

These optical signaling possibilities may be used, for example, to communicate to the user one or more of the following information:

Ultrasound enabled/disabled;
Ultrasound intensity;
Oscillation amplitude;
Ultrasound power;
Temperature of the medium;
Danger;
Malfunction;
Pressure of the medium;
Time of the exposure to ultrasound (e.g., blinking every second);
Cumulative energy input; or
Actual or optimum immersion depth.

To provide the operator with more information or to produce the shaded and/or brighter areas or markings, the ultrasound system may include an image generator that can be illuminated with the light source, with the image generator possibly generating different images depending on the operating states of the ultrasound system. The light from the light source, for example from a laser or an LED, may be incident on or through a mask, an aperture or an active matrix, such as a LCD or TFT, positioned in front and thus project a shape or an image into the field of view of the operator.

To illuminate the resonator or the field of view or workspace as uniformly as possible, without causing components of the ultrasound system and in particular the resonator to shade the workspace, the ultrasound system may have several light sources. Preferably, the resonator is disposed between the light sources and illuminated from several sides. To prevent partial or complete shading, for example by the resonator, at least two light sources may for example be positioned around the resonator. These light sources are preferably arranged so as to largely or completely prevent formation of shadows.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic diagram of an ultrasound system according to the present invention.

DETAILED DESCRIPTION OF PREFERRED EMBODIMENTS

This depicted embodiment is to be understood as illustrative of the invention and not as limiting in any way. It should also be understood that the figure is not necessarily to scale and that the embodiment is sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exemplary embodiment of the structure and functionality of an ultrasound system according to the present invention.

FIG. 1 shows the ultrasound system 1 schematically in a side view. The ultrasound system 1 includes an ultrasound generator 2, and a resonator 3 connected to the ultrasound generator 2 for transmitting the generated ultrasound to a medium to be treated with ultrasound. Furthermore, the ultrasound system 1 is constructed with a light source 4.

The resonator 3 extends in a direction R away from the ultrasound generator 2. In particular, the resonator 3 in the embodiment of FIG. 1 protrudes from one side 5 of the ultrasound generator 2, so that it can be easily brought into contact with a medium to be treated with ultrasound, without the ultrasound generator 2 itself contacting the media.

The light source 4 is arranged on the same side 5 of the ultrasound generator 2 as the resonator 3 and oriented so as to at least partially radiate in the direction R. A light cone 6 illuminated by the light source 4 during operation of the light source 4 extends substantially in the direction R or at least partially parallel to the resonator 3. Thereby, the light cone 6 illuminates the resonator 3 at least sectionwise, hence in sections, so that in particular a potentially free end 7 of the ultrasound generator 2 facing away from the ultrasound generator 2 is illuminated by the light cone 6. At least the end 7 of the resonator 3 is configured to directly contact the medium and to transmit the ultrasound to the medium.

Transverse to the direction R, the light source 4 is arranged in front of or behind the resonator 3 such that the resonator 3, when illuminated only with the light source 4, casts a shadow on its side facing away from the light source 4. To prevent such a shadow, the ultrasound system 1 of the exemplary embodiment of the FIG. 1 has an additional light source 8 arranged opposite the light source 4 in relation to the resonator 3. By arranging the resonator 3 between the light sources 4, 8, the light sources 4, 8 can also illuminate shadows produced by the respective other light source 4, 8, enabling a user of the ultrasound system 1 to clearly see all sides of the resonator 3 and in particular its end 7 from all sides of the resonator 3 during the operation.

In particular the illuminated region extending around the resonator 3 can be referred to as a workspace A. When the workspace A is illuminated in the region of the resonator 3 and in particular in the region of its end 7, an operator of the ultrasound system 1 can safely handle the ultrasound system 1 and easily visually check whether the resonator 3 is correctly placed in contact with the medium 10.

FIG. 1 shows the ultrasound system 1 with a container 9, wherein a flowable medium 10 to be treated with ultrasound is arranged in the container 9. At least the end 7 of the resonator 3 is immersed in the flowable medium 10 so as to transmit the ultrasound to the flowable medium 10, for example to atomize the medium.

By illuminating the resonator 3 with the light source 4 and optionally also with the light source 8, the operator of the ultrasound system 1 is not only able to detect where the resonator 3 dips into the flowable medium 10, but also how far the resonator 3 dips into the flowable medium 10. When the fluid medium 10 is a transparent medium, as in the exemplary embodiment in FIG. 1, the light cones 6, 6' of the two light sources 4, 8 may extend not only to a surface of the fluid medium 10, but also into the interior of the flowable 10 and maybe even to a bottom of the container 9. When the flowable medium 10 is not transparent, the light cones 6, 6' end substantially at the surface of the flowable medium 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An ultrasound system comprising:

an ultrasound generator, a resonator connected to the ultrasound generator for conducting ultrasound and supplying the ultrasound to a flowable medium, and a light source configured to illuminate at least sections of the resonator.

2. The ultrasound system of claim 1, wherein the light source is mounted on the ultrasound generator so as to illuminate away from the ultrasound generator during operation.

3. The ultrasound system of claim 1, wherein the resonator is constructed so as to protrude from the ultrasound generator and the light source is oriented to illuminate along the resonator.

4. The ultrasound system of claim 1, wherein the resonator is rod-shaped and the light source is oriented to illuminate along the resonator during operation of the light source.

5. The ultrasound system of claim 1, wherein the light source is configured to sectionwise shadow or to sectionwise illuminate the resonator noticeably brighter compared to other illuminated areas.

6. The ultrasound system of claim 1, wherein the ultrasound system is configured to operate the light source differently depending on operating states of the ultrasound system.

7. The ultrasound system of claim 1, wherein the ultrasound system is configured to supply operating power to the light source, as soon as the ultrasound system generates ultrasound.

8. The ultrasound system of claim 6, wherein operation modes of the light source comprise one of periodically supply power to the light source, to vary the operation power of the light source, to change orientation of the light source and to change color of the light source.

9. The ultrasound system of claim 1, further comprising an image generator configured to be illuminated with the light source, with the image generator generating different images depending on operating states of the ultrasound system.

10. The ultrasound system of claim 1, comprising a plurality of light sources, wherein the resonator is arranged between the plurality of light sources.

* * * * *